No. 783,804. PATENTED FEB. 28, 1905.
L. A. SMITH.
DENTAL MEASURING INSTRUMENT.
APPLICATION FILED NOV. 26, 1904.
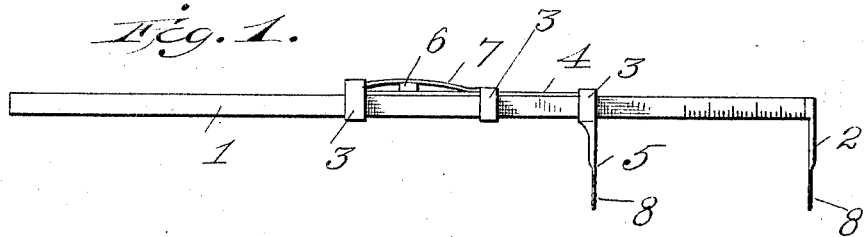
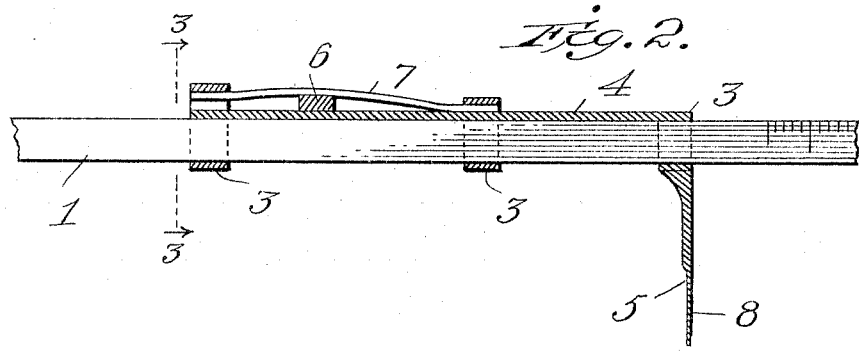
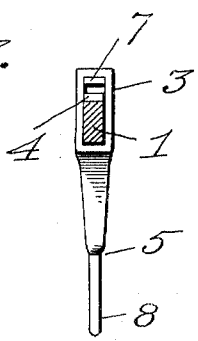

No. 783,804.                                              Patented February 28, 1905.

UNITED STATES PATENT OFFICE.

LAWRENCE A. SMITH, OF PORT GIBSON, MISSISSIPPI.

DENTAL MEASURING INSTRUMENT.

SPECIFICATION forming part of Letters Patent No. 783,804, dated February 28, 1905.

Application filed November 26, 1904. Serial No. 234,417.

*To all whom it may concern:*

Be it known that I, LAWRENCE A. SMITH, a citizen of the United States of America, and a resident of Port Gibson, in the county of Claiborne and State of Mississippi, have invented certain new and useful Improvements in Dental Measuring Instruments, of which the following is a full, clear, and exact description.

The object of this invention is to provide a simple and inexpensive device by the use of which the diameters of teeth and the spaces between teeth may be accurately and quickly ascertained. This object is accomplished by the use of the device illustrated in the accompanying drawings; and the invention consists in certain novel features of the same, as will be hereinafter first fully described and then particularly pointed out in the appended claims.

In the drawings just mentioned, Figure 1 is a side elevation of an instrument constructed in accordance with my invention. Fig. 2 is a longitudinal section of the sliding member, and Fig. 3 is a transverse section on the line 3 3 of Fig. 1.

In carrying out my invention I employ a stationary member consisting of a shank 1 and a jaw 2, rigidly secured to the end of the same. Mounted upon the shank is a sliding member which consists of a series of eyes or loops 3, a base or back 4, and a jaw 5. The jaw is formed integral with or secured to the innermost loop, and the back or base extends through the several loops and lies against the shank of the stationary member. The base is secured to or formed integral with the innermost and central loops, and its end projects freely in the outer loop. Between the outer and the central loops a lug or fulcrum-block 6 is formed on the back of the base, and over this lug or fulcrum-block rests a spring 7, having its opposite ends secured, respectively, to the central and outer loops. On the sides of the shank are formed scales to mark the measurements taken by the instrument. The jaws are similar in construction, and consist of thin metal blades having straight sides for a portion of their length, as indicated at 8, and between said straight portions and the shank of the instrument they are gradually increased in thickness, so as to impart the necessary rigidity and strength to the device.

The manner of using the device will be readily understood. The loops encircling the shank are pushed toward the rigid jaw, so as to carry the sliding jaw close to the same, and the instrument is then placed in the mouth of the patient and adjusted until the jaws bear firmly against the opposite sides of the tooth. The instrument is then withdrawn, and the diameter of the tooth will be denoted by the scale on the shank between the jaws. Should it be desired to measure a space between teeth, the jaws are adjusted until the outer sides of the same bear firmly against the sides of the teeth at the opposite ends of the space, after which the instrument is withdrawn and the measurement read upon the scale on the side of the shank opposite the side used in the before-described operation. It is to be noted that there are no set-screws or similar fastening devices employed to lock the jaws in their adjusted positions, so that the liability of injury to the mouth of the patient or the hands of the operator from that source is obviated. The free end of the spring holds the outer loop against the shank with sufficient force to bind it in an adjusted position, and the operation of the spring is accelerated and made certain by the provision of the fulcrum block or lug which intensifies the resilient action of the spring. When the operator is applying the instrument, he presses against the outer loop with his finger, and thereby overcomes the force of the spring, so as to permit the sliding member to be moved along the shank, and when the desired adjustment has been attained it is necessary merely to release the pressure of the finger, when the spring at once binds the loop against the shank so as to maintain the adjustment.

The device is obviously simple in its construction, and it constitutes an efficient addition to the equipment of a dentist.

Having thus described my invention, what I claim, and desire to secure by Letters Patent, is—

1. A dental measuring instrument consisting of a stationary member, and a sliding member having a series of loops fitting on the stationary member, a back secured to one of the loops and having its end playing in another loop, and a spring secured to the said last-mentioned loop and carried by the back.

2. A dental measuring instrument consisting of a stationary member and a sliding member mounted thereon, the said sliding member comprising a series of loops encircling the stationary member, a back connecting some of the loops and having its end playing freely in one of the loops, a fulcrum-block on said back, and a spring secured beyond said fulcrum-block, passing over the same and having its end secured to the loop in which the free end of the back plays.

In testimony whereof I have signed this specification in the presence of two attesting witnesses.

LAWRENCE A. SMITH.

Witnesses:
JOHN McCALEB MARTIN,
HENRY W. M. DRAKE.